Figure 5:
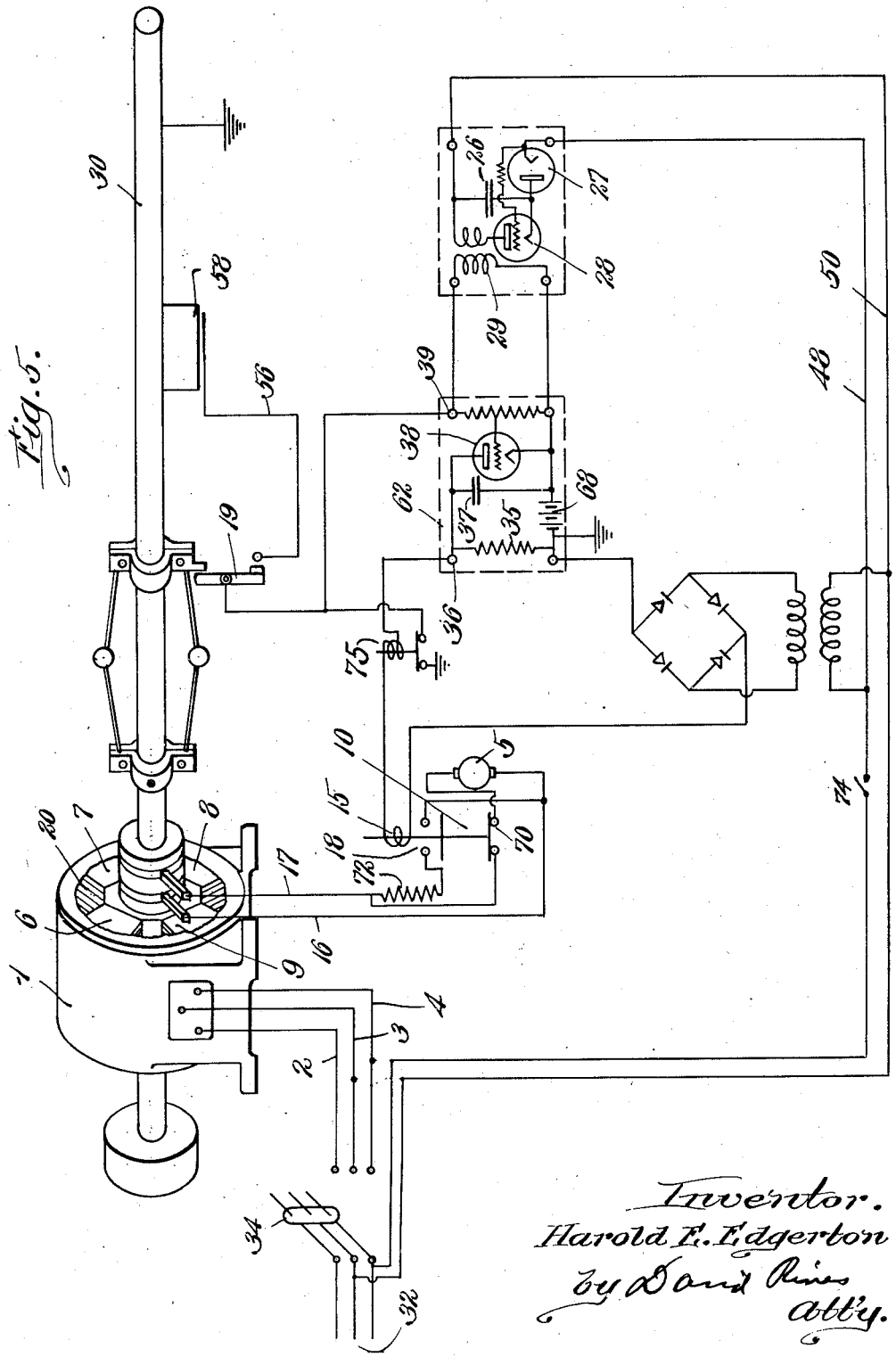

June 18, 1940.   H. E. EDGERTON   2,205,247
SYNCHRONOUS-MOTOR-CONTROL SYSTEM
Original Filed Nov. 18, 1936   3 Sheets—Sheet 1
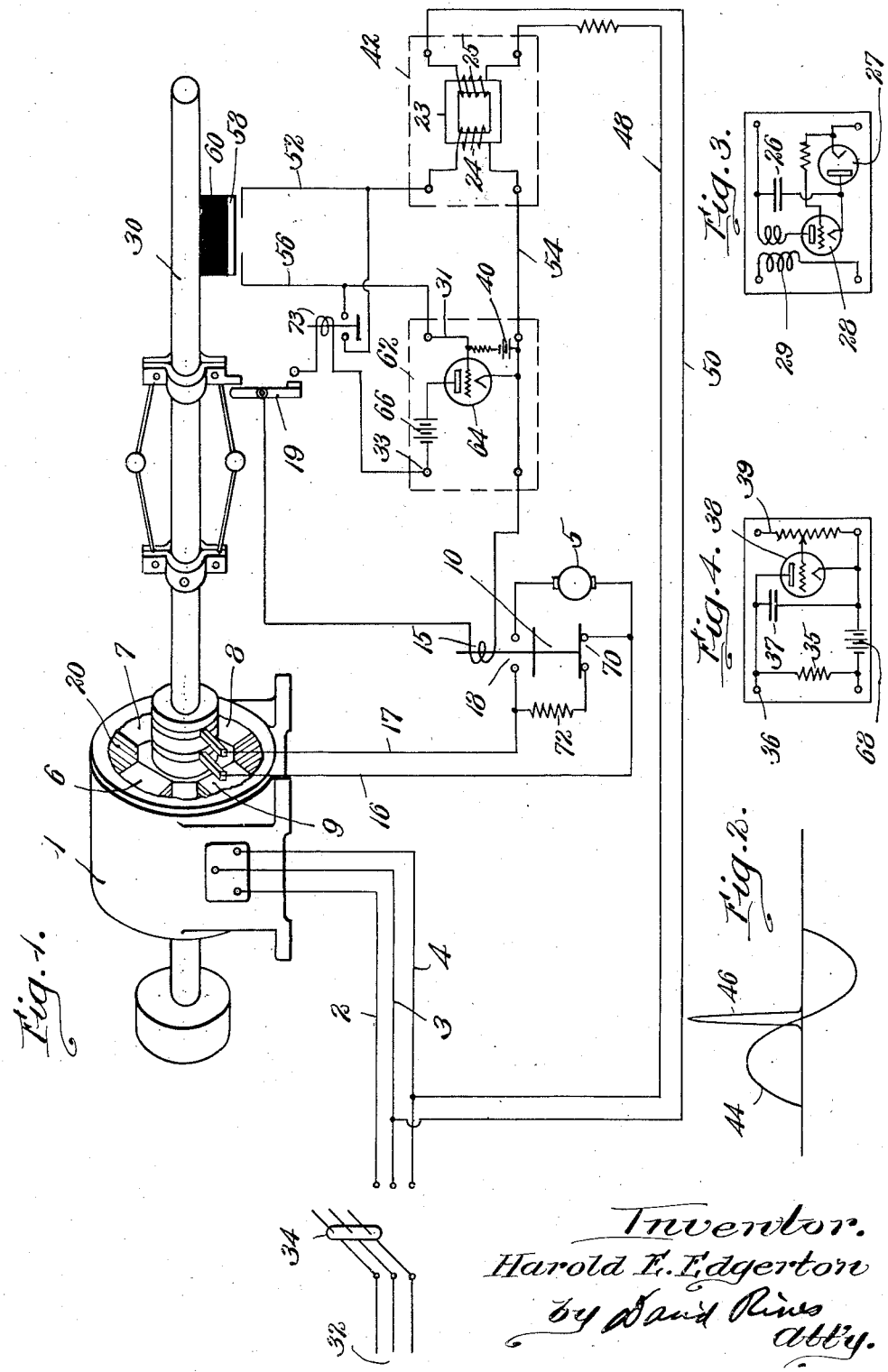
Inventor.
Harold E. Edgerton
by David Rines
Atty.

June 18, 1940.  H. E. EDGERTON  2,205,247
SYNCHRONOUS-MOTOR-CONTROL SYSTEM
Original Filed Nov. 18, 1936  3 Sheets-Sheet 2

Inventor.
Harold E. Edgerton
by David Rines
Att'y.

June 18, 1940. H. E. EDGERTON 2,205,247
SYNCHRONOUS-MOTOR-CONTROL SYSTEM
Original Filed Nov. 18, 1936  3 Sheets—Sheet 3
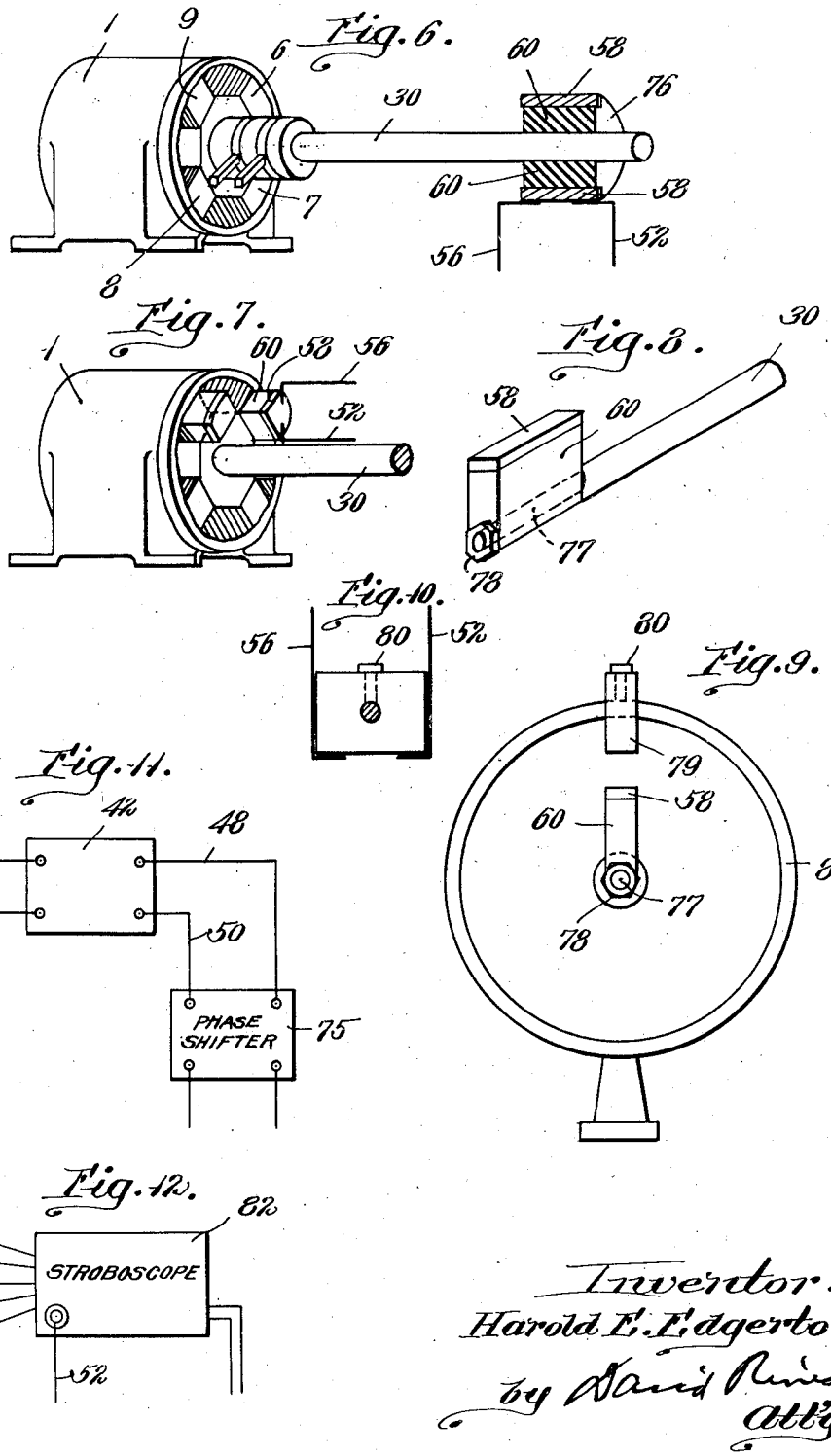
Inventor.
Harold E. Edgerton
by David Rines
Atty.

Patented June 18, 1940

2,205,247

UNITED STATES PATENT OFFICE 2,205,247

SYNCHRONOUS-MOTOR-CONTROL SYSTEM

Harold Eugene Edgerton, Cambridge, Mass., assignor to Westinghouse Electric & Manufacturing Company, East Pittsburgh, Pa., a corporation of Pennsylvania Application November 18, 1936, Serial No. 111,456
Renewed December 22, 1939

3 Claims. (Cl. 172—289)

The present invention relates to synchronous-motor-control systems.

In a copending application, Serial No. 675,348, filed June 12, 1933, there is disclosed a novel system for controlling a synchronous motor. After the motor is started as an induction motor, its field switch is closed to connect the field winding to a source of exciting current at the moment when there is a predetermined angular displacement, in electrical degrees, between the axis of a physical field pole and an imaginary field pole that would generate the terminal voltage on open circuit. This is the same as the angle between the axis of a physical field pole and the axis of a pole of the flux produced by the armature; or the angle between the field winding and the flux set up in the air gap by the armature currents. By suitable choice of this closing angle, it is possible to synchronize with a larger load than would otherwise be the case. By suitable adjustment, the field relay may be caused to close at the most favorable angle, for pulling into step the largest load, at the same time reducing objectionable oscillations and surges of current in the armature.

An object of the present invention is to improve upon the synchronous-motor-starting system of the above-described application, to the ends of simplifying the construction and reducing the expense of manufacture, but without lowering the efficiency.

Other and further objects will be described hereinafter and will be particularly pointed out in the appended claims.

The invention will now be described in connection with the accompanying drawings, in which Fig. 1 is a diagrammatic view of circuits and apparatus constructed and arranged according to one embodiment of the present invention; Fig. 2 is a diagrammatic view illustrating the operation of part of the preferred apparatus; Figs. 3 and 4 are similar views of apparatus that may be substituted for other apparatus in Fig. 1; Fig. 5 is a similar view of a modification; Figs. 6, 7 and 8 are perspective views of details of further modifications; Fig. 9 is an elevation of a detail of a further modification; Fig. 10 is a view of a detail looking from the side of Fig. 9; and Figs. 11 and 12 are details of further modifications.

A synchronous motor 1 is shown having the usual rotor construction whereby the field poles 6, 7, 8 and 9 rotate. The stator or armature is connected by a plurality of line-conductor wires 2, 3 and 4 to an alternating-current supply of power 32 by means of a switch 34. The motor 1 is brought up to speed when these wires are energized upon the closing of the switch 34. Usually this is done through a step-down auto-transformer in order to reduce the current taken by the motor. Polyphase power from the lines causes the armature to produce a rotating magnetic field in the motor which gives an induction-motor torque to the rotor for starting. The rotor speeds up and finally reaches a speed which depends upon the amount of load on the shaft. This rotor speed is slightly below synchronous and slightly less than that of the rotating magnetic field.

Though the field of this synchronous motor is shown and described as rotating, it will be understood that the invention is equally applicable to synchronous motors in which the armature rotates.

Direct current from any source, such as a generator 5, when connected by wire conductors 16 and 17 to the field circuit including the poles 6, 7, 8, 9 by a field switch or relay 10, causes the field circuit to produce a magnetic field. The rotor poles 6, 7, 8 and 9 are either attracted or repulsed by the magnetic poles that are caused by the polyphase alternating voltage on the stator, depending upon the relative angular position.

If the field switch 10 is closed at such an angle that there is a force between the rotor and the stator poles tending to accelerate the rotor, then the rotating part is speeded up in such a direction as to raise the speed of the motor to synchronism. If the switch is closed at such an angle that there is a force tending to decelerate the rotor, then the rotating part is slowed down, which retards synchronism. Should the load be small enough, the motor may ultimately synchronize even if the field switch 10 is closed under the worst possible conditions. If the switching is angularly controlled, however, the motor is able to pull a larger load up to synchronous speed.

The box 42 shown in Fig. 1 represents a device for producing a peaked voltage wave from a sinusoidal wave. The sinusoidal wave is diagrammatically represented in Fig. 2 by the curve 44 and the peaked wave by the curve 46. A preferred requirement of the device 44 is that the peaked wave should appear always at the same, identical part of each cycle of the input. As shown in Fig. 1, this may be effected by means of a transformer 23 having a magnetic core of small cross section. Such transformers are often called "peaking" transformers. The sinusoidal-current wave 44 is impressed upon the primary winding 25 of the transformer 23 by connecting it, through the medium of conductors 48 and 50 to the line conductors 3 and 4, or in any other desired manner. The illustrated connections ensure that the frequency and the phase relationship of the wave 44 shall be the same as that of the voltage of the power source 32 from which the motor 1 is driven. The peaked-voltage wave 46 appearing in the secondary winding 24 of the transformer 23 will be applied to a circuit presently to be described. To this end, one terminal of the secondary winding 24 is shown connected to an electrode 52 and the other terminal to a conductor 54.

The peaking transformer 23 is not the only device for producing the peaked-voltage wave 46 from the sinusoidal wave 44 appearing between the line conductors 3 and 4. The conductors 48, 50 may be connected, instead, for example, to a condenser 26, as illustrated in Fig. 3, in order to charge the condenser 26 once corresponding to each cycle, through a rectifier 27. The condenser is discharged, as quickly as it is charged, once corresponding to each cycle, through the medium of a three-element vacuum or gas-filled tube 28 and a transformer 29. The rectifier is shown as of the two-element vacuum-tube type, its filament being shown connected, through a resistor, to the grid of the tube 28. The condenser 26 is connected in parallel with the vacuum tube 28 and the primary winding of the transformer 29 connected in series relation, and the secondary winding of the transformer 29 is connected to the electrode 52 and the conductor 54 in the same way as before described for the secondary winding 24 of the peaking transformer 23. With proper design, the output of the transformer 29, thus applied to the electrode 52 and the conductor 54, will be oscillatory and very short in duration. The surge of voltage will occur at the same part of the input voltage wave. Adjustment of the instant is adjustable by changing the relative values of the circuit elements.

It will further be understood that other methods of producing the peaked-voltage wave 46 from the sinusoidal wave 44 are also within the scope of the present invention and that, from some points of view, the invention may be employed even without transforming the wave from the sinusoidal form 44 to the peaked form 46. The essential thing is that the apparatus be actuated by suitable impulses to energize a coil 15 for actuating the field relay 10, thus connecting the field circuit, through the wires 16 and 17, to the generator 5 which provides the exciting current.

The electrode 52 and another electrode 56, spaced therefrom, as illustrated, may be of any desired form, such as simple wires. They are shown disposed substantially parallel and adjacent to a conducting member 58, insulated at 60 from the shaft 30 of the motor 1. As the shaft 30 rotates, therefore, the conducting member 58 attached thereto will approach toward, and recede from, the electrodes 52 and 56 once corresponding to each rotation of the shaft 30. Once during each rotation of the shaft 30, therefore, the capacity between the electrodes 52 and 56 will attain a maximum value. When the conducting member is closest to the electrodes 52 and 56, the capacity coupling between these electrodes is increased many fold over what it is at other times. If desired, indeed, the conducting member 58 may be caused bodily to engage the electrodes 52 and 56 once during each rotation of the shaft 30, so as to establish a conducting path between the electrodes 52 and 56, thus acting as a commutator.

The conductor 54 and the electrode 56 are connected to an amplifying apparatus, shown in a box 62, typifying an electrical arrangement for receiving an electrical impulse from the electrode 56 so as to cause the operation of a field relay 10. The conductor 54 and the electrode 56 are connected to the input of this electrical apparatus 62 and the energizing coil 15 of the relay 10 is connected to its output. The closing of the relay 10 will result in connecting the field circuit 6, 7, 8, 9 to the source 5 of exciting direct current. The field switch 10 is thus constrained to close only at the instant that the conducting member 58 is nearest to, or in contact with, the electrodes 52 and 56, as before described. The capacity coupling between the electrodes 52 and 56 is so designed that the voltage appearing on the electrode 56 due to the potential suddenly applied to the electrode 52 from the pulse generator 42 is insufficient to operate the apparatus 62, except when the shaft 30 is so positioned that the conducting member 58 is nearest to, or in contact with, the electrodes 52 and 56. At such time, the conducting member 58 is parallel, and quite close, to, or in contact with, the electrodes 52 and 56, and a pulse of voltage on the electrode 52 will then induce or conductively transmit to the electrode 56 a pulse of voltage large enough to operate the apparatus 62 and thus to close the field relay 10.

There are many types of electrical apparatus 62 suitable for the performance of this operation. The type illustrated in Fig. 1 comprises a gas-filled discharge tube 64 the grid of which is connected by a conductor 31 to the electrode 56 and the filament of which is connected to the conductor 54. The voltage on the electrode 56 is thus the same as the voltage on the grid of the tube 64. A bias voltage 40 is adjustable so that the voltage on the electrode 56 is insufficient to start the tube 64 when the conducting member 58 occupies any position except that nearest to the electrodes 52 and 56, as before described. The plate of the tube 64 is connected, in circuit with a plate battery 66, to a terminal 33. The discharge tube 64 causes current from the battery 66 to flow through the coil 15 of the relay 10 when a voltage exceeding a predetermined minimum value appears on the grid of the tube 30 and after a switch 19 is closed.

The amplifier circuit 62 illustrated in Fig. 1 may, of course, be replaced by any other suitable apparatus, such as is illustrated in Fig. 4. The conductor 31 of Fig. 1 is here replaced by a conductor 39, connecting the electrode 56 to the grid of a gaseous-discharge tube 38. When tripped by the voltage from the electrode 56, this gaseous-discharge tube 38 short-circuits a condenser 37, which is connected across the plate and the cathode of the tube 38. Current is thereupon caused to flow in the plate circuit of the tube 38 from a plate battery 68, so as to supply energizing current to the coil 15 of the field relay 10. A resistor 35 is connected in parallel to the external circuit of the tube 38, the function of which is primarily to charge initially the condenser 37 when the switch 19 is open. A terminal 36 corresponds to the terminal 33 of Fig. 1.

The switch 19 is connected in the circuit of the coil 15 to prevent closing of the field relay 10 until the fulfillment of requirements other than those required by the angular displacement are fulfilled. The switch 19 may be closed at any desired, definite time after the closing of the line switch 34. It may be closed either manually or by a relay connected to operate as a function of speed, time, or any other factor, such as slip. In the drawings, the switch 19 is shown diagrammatically as a centrifugal switch, driven by the motor shaft 30. By thus delaying closing of the switch 19, it is assured that the field relay 10 shall not close until the motor 1, due to the induction-motor effect, approaches synchronous speed.

The present invention may thus be combined with the usual control scheme for synchronous motors.

The field relay 10 is shown provided not only with contact members 18 for connecting the exciter 5 to the field winding when the relay is energized by the coil 15, but also with normally closed contact members 70 for opening the circuit of a field-discharge resistor 72 that is normally connected in the field circuit containing the poles 6, 7, 8, 9 to protect the field windings at the time of starting the motor. The contact members 70 need not be connected to the field relay 10; it is sufficient if they are opened at any suitable time after the starting period of the motor, and in any desired way.

Though but a single conducting member 58 is illustrated in Fig. 1, it will be understood that a number of such insulated conducting members may be provided, one for each pair of poles. Two such conducting members 58 are illustrated in Fig. 6. These conducting members may be attached to the pole pieces themselves, if desired, as illustrated in Fig. 7, especially on slow-speed motors that have many poles. They may be radially spaced with respect to the shaft 30, as also illustrated in Fig. 6, or they may be otherwise positioned. The insulating material 60 may be in the form of a commutator 76 about the shaft, as illustrated in Fig. 6, and the electrodes 52 and 56 may be replaced by brushes, especially if only a single conducting member 58 is employed. The brushes are likewise illustrated in Fig. 6.

The pulse voltage applied to the electrode 52 may be made quite high in value; so high, indeed, that a spark will actually jump from the electrode 52 to the conducting member 58 and to the electrode 56, thus tripping the apparatus 62 in a very positive manner.

The operation may be described as follows: Assuming the motor 1 to be at rest, the switch 34 will be closed, connecting the motor armature to the main-line conductors 2, 3 and 4, thus starting the motor, due to the induction-motor torque. The motor will eventually attain a speed near to synchronism, and will continue to operate at such speed as an induction motor. Once during each cycle, the pulse generator 42 applies a sudden pulse of voltage to the electrode 52. The conducting member 58 will occupy a slightly different position each time that this pulse of voltage appears on the electrode 52. The position of this conducting member 58, indeed, will recede at the slip frequency, which is usually about 2 or 3 per cent of the stator frequency; periodically, therefore, once each slip cycle, the conducting member 58 will occupy a position where the capacity coupling between the electrodes 52 and 56 will cause the apparatus 62 to respond, thereby causing a closing of the field relay 10.

The angular displacement between the rotating stator flux and the field winding, so as to provide the most favorable angle at which the field relay 10 closes, is adjustable by angularly adjusting the position of the conducting member 58 upon the shaft 30 or the position of the electrodes 52 and 56, or by adjusting the phase of the voltage pulse compared to the stator voltage. In Fig. 8, the conducting member 58 is shown angularly adjustable upon the shaft 30 by means of a bolt and lock nut 78. In Figs. 9 and 10, the electrodes 52 and 56 are shown adjustable by mounting them on an insulating block 79 which may be clamped, by means of a screw 80, in any desired position on an insulating ring 81. In Fig. 11, a phase shifter 75 is shown interposed in the conductors 48 and 50 of Fig. 1. A convenient method of adjustment is to connect a stroboscopic lamp to the electrode 52 and observe the position of the conducting member 58 when the motor 1 operates at no load and in synchronism. The electrodes 52 and 56 should be adjusted to occupy this position or a position slightly ahead thereof. The stroboscopic lamp may be in a box 82, as illustrated in Fig. 12. The operation of the field switch should be quick although adjustment is possible by setting the position of the segment 58 ahead of the best angle.

According to the modificatiton shown in Fig. 5, the conducting member 58 is not insulated from the shaft 30, but is conductively connected thereto. The shaft 30 is, however, grounded, as shown, so that a circuit may be established to the correspondingly grounded circuits of the tube 38. As in the modification of Fig. 1, there may be as many such conducting members 58 as there are pairs of poles; and they may, if desired, be connected to the field pole pieces. The electrode 56 is positioned close to the conducting member 58 at one point in the rotation of the shaft 30. The apparatus 42 may be arranged as in Fig. 1 or Fig. 3, or in any other desired way; the apparatus shown in Fig. 3 is illustrated in Fig. 5, for the sake of variety. Instead of the apparatus shown in the box 62 of Fig. 1, furthermore, Fig. 5 illustrates the apparatus shown in Fig. 4, the grid of the tube 38 being adjustably connected to a resistor connected across the secondary winding of the transformer 29. The tubes 38 and 28 are grid-controlled, gaseous-discharge tubes, as heretofore described. They may be cold-cathode arc discharge tubes of the type forming the subject matter of a copending application, Serial No. 58,669, filed November 7, 1935, by K. J. Germeshausen, since they do not require time in order to heat the cathode.

The circuits are so adjusted that the tube 38 is caused to operate every cycle so long as the conducting member 58 is not opposite to the electrode 56. When these members are opposite to each other, however, the short gap, or the capacity, between them causes a load to be placed on the secondary winding of the transformer 29, thereby causing reduction of the voltage to such an extent that the tube 38 is not tripped. The normally open, raised field relay 10 will then be allowed to drop to connect the exciter 5 to the field circuit containing the poles 6, 7, 8, 9. The field-switching relay 10 is shown in the closed position.

In Fig. 5, since the field relay 10 is normally energized, the switch 19 is shown connected in the input to the amplifier 62. To simplify the disclosure, no apparatus for opening the switch 19 is illustrated; and the switch 34 is similarly shown without apparatus for closing it.

The current of the coil 15 is shown provided from a bridge rectifier, supplied with energy from the conductors 48 and 50 through a transformer.

In the circuits of Fig. 1, a relay 73, and in the circuits of Fig. 5, a relay 75, are shown provided for keeping the field switch 10 in a closed position once it has operated. It is necessary to have an arrangement whose function is similar to that of these relays 73 and 75, since the operating angle is not the same as the best switching angle.

Further modifications will occur to persons skilled in the art, and all such are considered to fall within the spirit and scope of the invention, as defined in the appended claims.

What is claimed is:

1. A motor-control system having, in combination, a synchronous motor having an armature winding and a field winding, means for connecting the armature winding to a source of alternating current, a source of direct current, and means responsive to a selected position of the field winding with reference to the rotating field in the armature winding for connecting said field winding to said source of direct current, said means comprising two cooperating conducting members, one of the members being rotatable with the rotatable part of the motor, means for producing a peaked voltage from a source of sinusoidal voltage of substantially the same frequency and phase as the first-named source, and means for energizing the other conducting member in accordance with the peaked voltage.

2. In an electric system comprising a synchronous motor having two elements, namely, a stator and a rotor, one of the elements being an armature and the other element being a field winding, means for connecting the armature with an alternating-current supply of power, a relay for connecting the circuit of the field winding to a source of exciting current, whereby the alternating voltage supplied to the armature from the alternating-current supply of power produces a magnetic field that rotates in space at a synchronous speed, and whereby the direct voltage applied to the field winding from the source of exciting current produces a second magnetic field which rotates at synchronous speed when the motor is operating at synchronous speed and which reacts upon the first-named magnetic field to produce a torque that is a function of the angle of displacement between the said magnetic fields, a conducting member rotatable in synchronism with the rotor, a conducting member cooperative with the first-named conducting member, means connected with the source of alternating current for producing a peaked voltage corresponding to the voltage and the phase of the alternating current, means for energizing the second-named conducting member in accordance with the peaked voltage, and means controlled by the conducting members for closing the relay at a predetermined angle of displacement between the said magnetic fields.

3. A motor-control system having, in combination, a synchronous motor having an armature winding and a field winding, means for connecting the armature winding to a source of alternating current, a source of direct current, and means responsive to a selected position of the field winding with reference to the rotating field in the armature winding for connecting said field winding to said source of direct current, said means comprising a conducting member and a member capacitively coupled thereto, one of the members being rotatable with the rotatable part of the motor, means for producing a peaked voltage from a source of sinusoidal voltage of substantially the same frequency and phase as the first-named source, and means for energizing the other member in accordance with the peaked voltage.

HAROLD E. EDGERTON.